US012732708B2

(12) United States Patent
Li et al.

(10) Patent No.: US 12,732,708 B2
(45) Date of Patent: Sep. 8, 2026

(54) FLICKER MITIGATION USING AN EVENT-BASED CAMERA

(71) Applicant: Inivation AG, Zurich (CH)

(72) Inventors: Chenghan Li, Zurich (CH); Giovanni Lippolis, Zurich (CH); Adam Radomski, Zurich (CH)

(73) Assignee: Inivation AG, Zurich (CH)

( * ) Notice: Subject to any disclaimer, the term of this patent is extended or adjusted under 35 U.S.C. 154(b) by 0 days.

(21) Appl. No.: 19/111,998

(22) PCT Filed: Sep. 19, 2023

(86) PCT No.: PCT/IB2023/059272
§ 371 (c)(1),
(2) Date: Mar. 14, 2025

(87) PCT Pub. No.: WO2024/062383
PCT Pub. Date: Mar. 28, 2024

(65) Prior Publication Data
US 2026/0095676 A1 Apr. 2, 2026

(30) Foreign Application Priority Data
Sep. 21, 2022 (EP) .................................... 22196753

(51) Int. Cl.
*H04N 23/745* (2023.01)
*G06T 5/40* (2006.01)
(Continued)

(52) U.S. Cl.
CPC ............. *H04N 23/745* (2023.01); *G06T 5/40* (2013.01); *G06T 5/70* (2024.01); *G06V 10/25* (2022.01);
(Continued)

(58) Field of Classification Search
CPC ... G06T 2207/20182; G06T 5/40; G06T 5/70; G06V 10/25; G06V 10/82; G06V 20/584;
(Continued)

(56) References Cited

U.S. PATENT DOCUMENTS 8,520,959 B2 * 8/2013 Pandel .................. H04N 19/86 382/254
11,416,759 B2 8/2022 Lang et al.
(Continued)

FOREIGN PATENT DOCUMENTS

WO 2021190745 A1 9/2021

OTHER PUBLICATIONS

International Search Report and Written Opinion for PCT/IB2023/059272 mailed Dec. 19, 2023, 12 pages.
(Continued)

*Primary Examiner* — Antoinette T Spinks
(74) *Attorney, Agent, or Firm* — BLANK ROME LLP

(57) ABSTRACT

The invention relates to a method for mitigating flickering lights in a scene of interest imaged by an event-based camera, wherein the event-based camera comprises a plurality of pixels, wherein an imaging behaviour of the plurality of pixels is influenced by a set of pixel parameters comprising at least one exposure time parameter and/or at least one digital accumulation parameter, and wherein the method comprises the following steps: 1) operating the event-based camera having an assignment of first values to the set of pixel parameters, said operating providing a plurality of events generated by the event-based camera; 2) reconstructing an image based on at least the generated plurality of events, 3) determining at least one region in the reconstructed image, said determined at least one region corresponding to at least one spatial region in the scene of interest comprising at least one flickering light source active
(Continued)

during the operating of the event-based camera, 4) determining a subset of pixel parameters of the set of pixel parameters, which subset of pixel parameters influences imaging behaviour of pixels in the determined at least one region, assigning second values for the determined subset of pixel parameters, which second values are determined to mitigate flicker in the pixels of the determined at least one region, and updating the first values assigned to the subset of pixel parameters with the second values, and 5) further operating the event-based camera with the updated set of pixel parameters. The invention also relates to an assembly and to a vehicle comprising said assembly.

15 Claims, 1 Drawing Sheet

(51) Int. Cl.

| | |
|---|---|
| ***G06T 5/70*** | (2024.01) |
| ***G06V 10/25*** | (2022.01) |
| ***G06V 10/82*** | (2022.01) |
| ***G06V 20/58*** | (2022.01) |
| ***H04N 25/47*** | (2023.01) |

(52) U.S. Cl.
CPC ............ *G06V 10/82* (2022.01); *G06V 20/584* (2022.01); *H04N 25/47* (2023.01); *G06T 2207/20182* (2013.01)

(58) Field of Classification Search
CPC ...... H04N 23/71; H04N 23/745; H04N 25/47; H04N 25/707
See application file for complete search history.

(56) References Cited

U.S. PATENT DOCUMENTS

2011/0255597 A1* 10/2011 Mihara ................ H04N 19/176 375/E7.243
2020/0389582 A1 12/2020 Herman
2021/0067679 A1 3/2021 Tornes
2021/0397861 A1 12/2021 Elrasad et al.

OTHER PUBLICATIONS

European Search Report for European Application No. 22196753.2 mailed Mar. 21, 2023, 8 pages.
G. Gallego et al., "Event-Based Vision: A Survey," IEEE Transactions on Pattern Analysis and Machine Intelligence, vol. 44, No. 1, pp. 154-180, 2022, https://doi.org/10.1109/TPAMI.2020.3008413.

* cited by examiner

FLICKER MITIGATION USING AN EVENT-BASED CAMERA

CROSS-REFERENCE TO THE RELATED APPLICATIONS

This application is a National Phase entry of International Application Ser. No. PCT/IB2023/059272, filed on Sep. 19, 2023, which claims the benefit of priority of European Patent Application Ser. No. 22196753.2, filed on Sep. 21, 2022. The entire content of these applications are hereby incorporated by reference.

FIELD OF THE INVENTION

The present invention relates to a method for mitigating flickering lights in a scene of interest imaged by an event-based camera, to an assembly comprising an event-based camera and a computing device, and to a vehicle comprising the assembly.

BACKGROUND TO THE INVENTION

Light sources in cities such as traffic lights or rear/front lights of cars are increasingly using LEDs (light-emitting diodes) controlled by PWM (pulse width modulation) signals to control their brightness. PWM-induced cycles of ON and OFF brightness, however, can be incorrectly observed by conventional frame-based cameras which capture images at equidistant instances of time. Depending on exposure time and frequency of such a conventional frame-based camera, a PWM-modulated brightness signal could be interpreted correctly, or incorrectly as fully ON, fully OFF, or as flickering with different frequencies which may correspond to PWM-signal frequency, or which may differ from PWM-signal frequency. This situation is further complicated when light sources are used for transmitting information while their brightness is modulated with a PWM signal, as in case of car blinkers, for example.

In the context of autonomous driving, algorithmic processing of images of an environment through which a vehicle navigates is needed for autonomous decision making. Erroneous signal detection as previously described may in such a context lead to faulty autonomous decision making, thereby potentially endangering lives of passengers in the autonomous vehicle and of nearby pedestrians.

It is an objective of the present invention to provide a method and assembly for capturing images in a scene of interest in which errors due to flickering are at least partly mitigated.

SUMMARY OF THE INVENTION

According to a first aspect of the present invention there is provided a method for mitigating flickering lights in a scene of interest imaged by an event-based camera, wherein the event-based camera comprises a plurality of pixels, wherein an imaging behaviour of the plurality of pixels is influenced by a set of pixel parameters comprising at least one exposure time parameter and/or at least one digital accumulation parameter, and wherein the method comprises the following steps:

1) operating the event-based camera having an assignment of first values to the set of pixel parameters, said operating providing a plurality of events generated by the event-based camera;

2) reconstructing an image based on at least the generated plurality of events,
3) determining at least one region in the reconstructed image, said determined at least one region corresponding to at least one spatial region in the scene of interest comprising at least one flickering light source active during the operating of the event-based camera,
4) determining a subset of pixel parameters of the set of pixel parameters, which subset of pixel parameters influences the imaging behaviour of pixels in the determined at least one region, assigning second values for the determined subset of pixel parameters, which second values are determined or selected to mitigate flicker in the pixels of the determined at least one region, and updating the first values assigned to the subset of pixel parameters with the second values, and
5) further operating the event-based camera with the updated set of pixel parameters.

In simple terms and with the necessary simplification, by assigning second values to the subset of pixel parameters, the imaging behaviour of the pixels in the at least one region can be changed. The exposure time can be prolonged by assigning a different value to the at least one exposure time parameter, or the digital accumulation can be changed by assigning a different value to the at least one digital accumulation parameter, which in return can further extend the exposure duration on a digital level. It can also be possible to assign different values to both. Prolonging and/or extending the exposure time or duration can reduce the sensitivity of the pixels to flickering light sources as the flickering will no longer perceived as a trail of consecutive pulses of light and fewer events or no events are generated at all, under the assumption the event-based camera is static.

Light sources such as light-emitting diodes controlled using pulse-width modulation in traffic lights or in car lights may be termed flickering light sources. Such light sources are typically present in scenes of interest comprising roads/traffic infrastructure. Present invention may, however, also be employed in other types of scenes of interest comprising flickering light sources.

The event-based camera for capturing images/imaging the scene of interest comprises a plurality of pixels, e.g., arranged as pixel array, and functioning/imaging behaviour of said pixels is influenced/controlled by a set of pixel parameters, possible pixel parameters, e.g., being exposure time(s) impacting analogue-domain detection signal accumulation: each pixel typically comprises a photodetector (e.g., a photodiode) converting light to, e.g., charge, and a detection signal, e.g., embodied as charge, provided by the photodetector may be accumulated over a period of time, the exposure time, in the analogue domain (analogue-domain detection signal accumulation) before the accumulated analogue-domain detection signal is converted to a digital representation (sampled detection signal) using an analogue-digital-converter. The analogue-digital-converter is configured to sample the detection signal accumulated in the analogue domain during the exposure time: one exposure therefore provides one sampled detection signal. The sampled detection signal (resp. the analogue-domain detection signal accumulated during one exposure time) may be linearly dependent on incident light intensity on the photodiode. Another possible pixel parameter may be a digital accumulation parameter: the sampled detection signal corresponding to the analogue-domain detection signal accumulated in analogue domain and sampled by the analogue-digital-converter may be (digitally) accumulated consecutively (consecutive accumulation may refer to the case that with respect to the underlying analogue-domain exposure the digital consecutive accumulation does not introduce gaps; said differently, the exposure times corresponding to those sampled detection signals which are consecutively accumulated may be aligned in time in such a way so as to form one large joint exposure time substantially without gaps) a number of times, the number of times being equal to an integer value of the digital accumulation parameter; digital accumulation thereby, e.g., refers to a summing up operation, the result of which digital accumulation may be termed digitally accumulated sampled detection signal. Since summing is a linear operation, the digitally accumulated sampled detection signal is typically linearly dependent on the incident light intensity as well.

The event-based camera may capture the scene of interest over a period of time, and during this period of time, value assignments to the set of pixel parameters (or only subsets of the set of pixel parameters, wherein the term subset may refer to a proper subset, i.e., the subset may have a smaller cardinality than the set of pixel parameters) may be modified. In case the event-based camera comprises a pixel array having a plurality of rows and a plurality of columns, sampled detection signals of pixels of the pixel array may be read-out row by row; before a pixel is revisited, all other pixels of the pixel array may therefore be visited first; an interval may be defined as smallest time step such that exposure time which may differ from one pixel to another always corresponds to an integer number of such intervals and also always starts and ends at boundaries of such intervals. Thus, at every boundary of such an interval, some pixels may be completing their exposure, and some of these pixels which completed their exposure may generate a respective event provided that their event condition is fulfilled. The read-out speed of pixels of the event-based camera may be adapted based on the length of said interval and/or optionally based on the number of columns and rows in the pixel array. An image may be reconstructed from events generated on the basis of the read-out and processed sampled detection signals. Individual pixels or group of pixels of the plurality of pixels may be associated to different pixel parameters. At a certain time, the event-based camera is operated with an assignment of first values to the set of pixel parameters, wherein the first values may be available a priori, e.g., embodied as initialisation parameters, or wherein the first values may have been determined or assigned based on a previous operating of the event-based camera. Determining can be a synonym for assigning in the course of the present disclosure. They may be used interchangeably when technically feasible or useful.

Each event of the generated plurality of events can comprise i) information on a pixel or a group of pixels of the plurality of pixels to which it can be associated, ii) a timestamp at which it was generated, and/or iii) a type of event condition involved in its generation. The different types will be explained in more detail below. Each event can be understood as a data entry or an event data entry in a data object. The data object as such can be provided in the form of a file on an electronic device external to the event-based camera or in a memory of the event-based camera itself.

An event condition may in general be based on comparing a digitally accumulated sampled detection signal of one pixel to a reference. For example, the event condition may be based on temporal contrast/difference, wherein the reference may be a previous digitally accumulated sampled detection signal of the same pixel; or the event condition may be based on spatial contrast/difference, wherein the reference may be a (current) digitally accumulated sampled detection signal of another pixel in the neighbourhood of the pixel; or the event condition may be based on spatial and temporal contrast/difference, wherein the reference may be a previous digitally accumulated sampled detection signal of another pixel in the neighbourhood of the pixel; or lastly, the event condition may be based on simple thresholding, wherein the reference may be a fixed value. Herein the previous digitally accumulated sampled detection signal may have been acquired an integer multiple of the interval before the (current) digitally accumulated sampled detection signal of the pixel.

When the event condition is based on temporal contrast/difference and/or spatial contrast/difference, an event may be generated if a digitally accumulated sampled detection signal of a pixel differs by at least a threshold amount from the reference. The threshold amount may be a static value, or a dynamic value that is dependent on the digitally accumulated sampled detection signal and/or the reference, wherein the dependence may be linear, i.e. the threshold amount may be proportional to the digitally accumulated sampled detection signal and/or the reference, or the dependence may be nonlinear, e.g. the threshold amount may be proportional to the square root of the digitally accumulated sampled detection signal and/or the reference. An event may only implicitly comprise the type of event condition involved in its generation, for as long as it is known which event condition was involved in the generation of an event, this event condition may not need to be explicitly comprised by the event.

The accordingly generated event may comprise polarity information whether said differing was positive or negative, for example, address information where the event was generated as well as timing information when the event was generated. Each pixel of the event-based camera therefore only transmits information if a quantity related to the event condition has sufficiently changed, thereby potentially sparsifying output of the event-based camera. Before event generation, the digitally accumulated sampled detection signals (in the digital domain) may be pre-processed, for example to remove inter-pixel mismatch, in particular gain mismatch, caused by fabrication process variation.

The reconstructing of an image may be carried out based on such events in an incremental fashion. For each pixel of the reconstructed image, wherein the reconstructed image may have a same size as the pixel array of the event-based camera, an updating of the pixel value of the reconstructed image may occur when the corresponding pixel of the event-based camera generates a new event: for example, threshold amount(s) (or multiples thereof) associated with mentioned event condition may be added/subtracted from the current pixel value of the reconstructed image to obtain an updated reconstructed image. Other types of reconstructing images from events are known from prior art; in general, reconstruction depends on the type of event condition used during the generation of events, specifically on the type of information contained in the events, i.e., whether an event comprises information on a sign and/or on a magnitude of temporal contrast/difference and/or on a spatial contrast/difference. Images may also be reconstructed by processing a group of events together and by updating the reconstructed image based on the processed group of events. Examples of methods for reconstructing images from events are disclosed in Gallego et al.; Event-based Vision: A Survey; IEEE Transactions on Pattern Analysis and Machine Intelligence, 2020; https://doi.org/10.1109/TPAMI.2020.3008413. They can also be used to reconstruct an image from the events, even if the event-based camera captured a flickering light source.

Region(s) are then subsequently determined in the reconstructed image which may be associated to parts of the spatial scene of interest in which flickering light sources may be present. Subsequently, a subset of pixel parameters of the set of pixel parameters is determined which subset of pixel parameters is linked to the determined region(s), linking implying that changing pixel parameters in the subset of pixel parameters alters imaging behaviour of the pixels in the determined region(s). Suitable second values are determined or assigned for the subset of parameters which mitigate flickering in the determined region(s) in case of further operating of the event-based camera. The second values for the pixel parameters associated to pixels in the determined region(s) may differ from one pixel to another in said determined region(s). Pixel parameters influencing imaging behaviour of pixels which are not in the determined at least one region may be set to optimise signal-to-noise-ratio (SNR) and/or temporal resolution, for example. In this way, only imaging behaviour of those pixels associated to flickering are adapted to mitigate flickering, while remaining pixels may be adapted to optimise overall imaging behaviour based on specific requirements which may be tried to be achieved, e.g., trying to achieve a minimal signal-to-noise-ratio.

In an embodiment of the method according to the invention, the event condition involved in the generation of the plurality of events is embodied as a temporal contrast condition and/or as a temporal difference condition and/or as a spatial contrast condition and/or as a spatial difference condition.

In a further embodiment of the method according to the invention, wherein analogue-domain detection signal accumulation of each pixel, the detection signal being provided by a photodetector comprised by the respective pixel, is influenced by the at least one exposure time parameter (using an exposure time parameter associated to a pixel, duration of an exposure time may be controlled and set), wherein each pixel or a group of pixels of the plurality of pixels is associated to an exposure time parameter of the at least one exposure time parameter.

In a further embodiment of the method according to the invention, the plurality of pixels is arranged as a pixel array with a plurality of rows and a plurality of columns, wherein the event-based camera comprises a readout processor, and wherein the readout processor is configured to, during the operating of the event-based camera, consecutively read out one row from the plurality of rows after another and to generate the plurality of events.

In a further embodiment of the method according to the invention, the image is reconstructed based on i) the plurality of events and, optionally, ii) at least one previously generated image in case the generated plurality of events is generated based on the temporal contrast condition and/or based on the temporal difference condition. If the events contain intensity information, then the image can be reconstructed based on the events alone. If the events contain contrast/difference information, then the image can be reconstructed based on the events and a previously generated image.

In a further embodiment of the method according to the invention, the determining of the at least one region in the reconstructed image comprises the following steps: a) determining at least one histogram of the reconstructed image, b) thresholding the reconstructed image based on the determined at least one histogram, the thresholding providing two thresholded reconstructed images, c) filtering out noisy bright pixels in the two thresholded reconstructed images using at least one morphology function, and d) using a blob detection technique, determining bright spots in the two thresholded reconstructed images and selecting those bright spots from the determined bright spots whose shape is substantially similar in the two thresholded reconstructed images, with the selected bright spots being the determined at least one region.

One or more histograms may be determined from the reconstructed images. If more than one histogram is determined, different bin sizes for the different histograms may be used, for example. For the thresholding of the reconstructed image, one or two thresholds may be used: (i) in the case of one threshold and two histograms, for example, the two thresholded reconstructed images may be determined by respectively thresholding the two histograms with the one threshold; (ii) in the case of two thresholds (which may differ from one another) and one histogram, for example, the two thresholded reconstructed images may be determined by respectively thresholding the one histogram with the two thresholds. The threshold(s) used for thresholding may be determined based on the histogram(s) or alternatively be provided a priori. Morphology functions may, for example, be erosion, dilation, opening (concatenation of first erosion, then dilation), closing (concatenation of first dilation, then erosion), proper-opening, proper-closing or auto-median. Such morphology functions may be suitably combined to filter out noisy bright or dark pixels from the two thresholded reconstructed images. Bright spots may be determined in the two thresholded reconstructed images using well-known algorithms for blob detection; such bright spots may be compared across the two thresholded reconstructed images, and those bright spots may be used as the determined at least one region which can substantially be found in the two thresholded reconstructed images. In an alternative embodiment, only one thresholded reconstructed image is determined and compared with the reconstructed image to determine suitable bright spots. Besides using histogram(s) and threshold(s), the at least one region may alternatively be determined as follows: gamma-correction with two different power parameters y may be employed to provide two different gamma-corrected reconstructed images; these two gamma-corrected reconstructed images may subsequently be processed as described for the two thresholded reconstructed images.

In a further embodiment of the method according to the invention, the determining of the at least one region in the reconstructed image comprises applying a trained neural network to the reconstructed image, wherein the trained neural network provides the at least one region as output in the form of at least one bounding box and/or in the form of at least one anchor box and/or in the form of segmentation mask and/or in the form of a probability heatmap. The reconstructed image which may be provided as input to the neural network could be embodied as a grayscale or as a colour image of any bit depth for each of the image channels. Optionally the neural network could also take the above-mentioned histograms as inputs. The neural network may comprise multiple layers, with some of the multiple layers potentially being embodied as convolutional layers. The neural network may also comprise one, two or more non-linear activation functions and/or normalization layers. Some of the layers of the neural network may have skip connections between them. The neural network may be trained using a set of annotated reconstructed images and/or their corresponding histograms, with bright spots being human annotated in form of bounding boxes. The annotations may be all containing the same label, e.g., "light" or may be distinguishing different types of bright spots, e.g., "car light", "street lamp" etc. Before the training the neural network may be initialized with random numbers and trained from scratch or some of the layers may be pre-trained using publicly available classification datasets.

In a further embodiment of the method according to the invention, the determined subset of pixel parameters comprises at least one exposure time parameter and at least one digital accumulation parameter, and wherein the assigning of the second values for the at least one exposure time parameter and the at least one digital accumulation parameter comprises as steps: a) assigning a required total accumulation duration, which required total accumulation duration is based on flickering frequencies of the at least one flickering light source active during the operating of the event-based camera, or receiving a desired total accumulation duration, b) based on the determined required total accumulation duration or the desired total accumulation duration and sampled detection signals of the pixels in the at least one determined region obtained during the operating of the event-based camera, determining the second values for the at least one exposure time parameter in such a way that the pixels in the determined at least one region are not oversaturated during the further operating, and c) assigning the second values for the at least one digital accumulation parameter based on the determined second values for the at least one exposure time parameter and the determined required total accumulation duration or the desired total accumulation duration.

A first value of the exposure time parameter may have been determined to maximize signal-to-noise-ratio (SNR) of the pixel and at the same time prevent saturation of the pixel. One of the main noise sources in an image sensor is photon shot noise; SNR is in that case approximately equal to the square root of the total number of photons collected during one exposure. Therefore, it may be desirable to have a longer exposure time as long as the pixel is not saturated. However, the longer the exposure time, the lower the sampling rate, i.e., temporal resolution, of the pixel. In general, there is therefore a trade-off between SNR and temporal resolution of a pixel, and the optimal point may typically depend on the application. For example, for automotive applications, it may be necessary to ensure that temporal resolution is at least 30 Hz, implying that the exposure time may not be set to be longer than 33 ms even if SNR is compromised in this case. On the other hand, optimizing temporal resolution may mean to set the exposure time as short as possible, given a required SNR based on the application. Because SNR is approximately the square root of the accumulated signal, the accumulated signal can be evaluated to estimate SNR. For example, if the application requires an SNR of '100', which corresponds to an accumulated signal of '500', then the exposure time could be set to the shortest value that results in the accumulated signal to be at least '500'.

A first value of the digital accumulation parameter may be set to '1', i.e., the digital accumulation only contains/sums together one sampled detection signal, to maximize temporal resolution of the pixel. Alternatively, a first value of the digital accumulation parameter may be set to achieve a certain desired total accumulation duration corresponding to a desired temporal resolution of the pixel based on the application, for example, a desired temporal resolution of 30 Hz corresponds to a desired total accumulation duration of about 33 ms. In particular, the first value of the digital accumulation parameter may be derived as the desired total accumulation duration divided by the first value of the exposure time parameter.

Flicker mitigation may be directly carried out by changing the exposure time parameter(s). The second value of the exposure time parameter may be set equal to or larger than the required total accumulation duration as long as the pixel is not saturated. To check or project if the pixel is or may become saturated, a sampled detection signal of that pixel may be compared to a predetermined potential saturation threshold. If the sampled detection signal corresponds, e.g., to a 10-bit value, the potential saturation threshold may be set to a value smaller than the maximum 10-bit value, such as '500' or '700'. For example, in case the required total accumulation duration is 16 ms, the sampled detection signal obtained in the previous 16 ms can be evaluated to project if the second value for the exposure time parameter can be set to 16 ms without saturating the pixel. Alternatively, the second value for the exposure time parameter can straightaway be set to 16 ms and can be readjusted if the subsequent sampled detection signal shows that the pixel is saturated (in case the sampled detection signal exceeds the potential saturation threshold, for example, the second value for the exposure time parameter may be reduced, e.g., by 50 percent).

If setting the second value of the exposure time parameter to the required total accumulation duration would saturate the pixel, then flicker mitigation would in this case be realised with the help of the digital accumulation parameter(s). In this case, the second value of the exposure time parameter may be set to equal the first value, or higher than the first value, i.e., a highest value without saturating the pixel. For example, in case the second value of the exposure time parameter is set to 8 ms to prevent saturating the pixel, and the required total accumulation duration is 16 ms, then the second value of the digital accumulation parameter would be set to '2'.

In general, the second value of the digital accumulation parameter may be derived as the required total accumulation duration divided by the second value of the exposure time parameter. In case there is also a desired total accumulation duration set by the application, then the second value of the digital accumulation parameter may be derived by dividing the higher value between the required total accumulation duration and the desired total accumulation duration by the second value of the exposure time parameter.

Preferably, both the exposure time parameter and the required total accumulation duration may be set as a power of '2' times of the interval previously defined (corresponding to a minimum exposure time): setting the exposure time and the required total accumulation duration in such a way may simplify the derivation of the digital accumulation parameter and may simplify normalization of the digitally accumulated sampled detection signal later on.

Overall, given that the first values of the exposure time parameter and the digital accumulation parameter for a pixel have been determined to optimize SNR and/or temporal resolution of the pixel based on the application, the following steps may be performed to determine second values of the exposure time parameter and the digital accumulation parameter for a pixel within the determined at least one region: Firstly, check if the first value of the exposure time parameter is longer than the total required accumulation duration—if so, the second values of the exposure time parameter and the digital accumulation parameter may be set equal to their respective first values; if not, check if the second value of the exposure time parameter can be set to the total required accumulation duration without saturating the pixel—if so, set the second value of the exposure time parameter to the total required accumulation duration; if not, set the second value of the exposure time parameter to at least the respective first value, or higher than the respective first value without saturating the pixel. Secondly, after the second value of the exposure time parameter is determined, determine the second value of the digital accumulation parameter based on the second value of the exposure time parameter, the total required accumulation duration or the desired accumulation duration. These steps may preferably be performed by the readout processor.

Therefore, the second values of the exposure time parameter and the digital accumulation parameter may differ between pixels. The pixels within the determined at least one region may have their pixel parameter set to achieve flicker mitigation as a first priority goal, and to optimise SNR and/or temporal resolution based on the application as a secondary goal. On the other hand, the pixels which are not in the determined at least one region may have their pixel parameters set to optimise SNR and/or temporal resolution based on the application as the only goal.

In a further embodiment of the method according to the invention, the flickering frequencies are assumed to be larger than 50 Hertz, in particular larger than 80 Hertz, and wherein the required total accumulation duration is determined in such a way that, in a reconstructed image based on a plurality of events generated during the further operating of the event-based camera, the flicker is mitigated. Alternatively, the flickering frequencies are assumed to be larger than 50 Hertz, in particular larger than 80 Hertz, and wherein the required total accumulation duration is chosen to be larger than the reciprocal of the assumed flicker frequency so that in a reconstructed image based on a plurality of events generated during the further operating (6) of the event-based camera, the flicker is mitigated. The reciprocal of the assumed flicker frequency can correspond to the flicker period of the flickering light source.

Since the exposure time parameter and the digital accumulation parameter may be determined and therefore be known, the digitally accumulated sampled detection signal can be normalized based on that knowledge, e.g., the digitally accumulated sampled signal may be normalized by being divided by the total number of the intervals corresponding to the digital accumulation. Many flickering light sources in scenes of interest such as road networks may be assumed to have known flickering frequencies. In case the method according to the invention is used in such scenes of interest, flickering frequencies may be known and therefore do no need to be determined, for example. For example, 50 Hertz and 80 Hertz may correspond to the lowest flickering encountered in automotive use cases; these frequencies or higher frequencies are typically also not perceptible to the human eye, and hence need to be mitigated by the event-based camera to be interpreted correctly.

In a further embodiment of the method according to the invention, each pixel in the plurality of pixels comprises its own exposure time parameter, or wherein groups of pixels in the plurality of pixels share an exposure time parameter.

Each pixel in the plurality of pixels may also comprise its own digital accumulation parameter, or groups of pixels in the plurality of pixels may share a digital accumulation parameter.

In a further embodiment of the method according to the invention, the at least one flickering light source is embodied as a traffic light source and/or as a car light source.

In a further embodiment of the method according to the invention, the plurality of events is generated at multiples of a period of a global clock of the event-based camera. Specifically, the plurality of events may be generated at boundaries of previously defined intervals, wherein exposure time may be an integer multiple of the interval.

According to a second aspect of the present invention there is provided an assembly comprising a) an event-based camera comprising at least i) a plurality of pixels arranged as a pixel array, ii) a readout processor, and iii) parameter memory for storing a set of pixel parameters, and b) a computing device, in particular embodied as a microprocessor, wherein the event-based camera is configured to transmit generated events to the computing device, wherein the assembly is configured to carry out a method according to the first aspect of the present invention, wherein the event-based camera is configured to carry out method steps 1), 4) and 5) of the method according to the first aspect of the present invention, and wherein the computing device is configured to carry out method steps 2) and 3) of the method according to the first aspect of the present invention.

In an embodiment of the assembly according to the second aspect of the present invention, the computing device is part of the event-based camera, or the computing device is an external computing device separate from the event-based camera.

According to a third aspect of the present invention there is provided a vehicle comprising an assembly according to the second aspect of the present invention, wherein the vehicle is configured to drive in a scene of interest comprising traffic lights and/or car lights of other vehicles.

A vehicle may be embodied as a conventional car or motorcycle, for example.

BRIEF DESCRIPTION OF DRAWINGS

Exemplar embodiments of the invention are disclosed in the description and illustrated by the drawings in which.

DETAILED DESCRIPTION OF DRAWINGS

Figure 1:
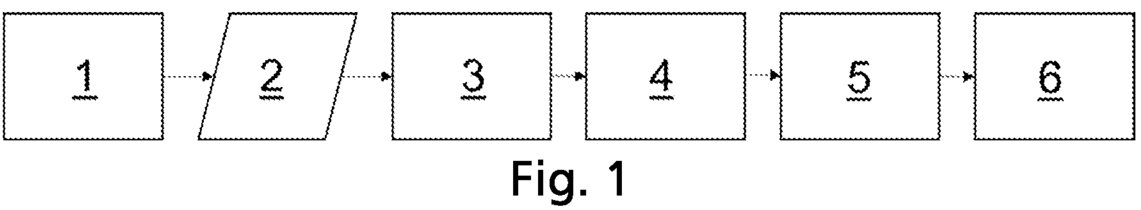
FIG. 1 illustrates schematically an embodiment of the method for mitigating flickering lights in a scene of interest imaged by an event-based camera.

FIG. 1 illustrates schematically an embodiment of the method for mitigating flickering lights in a scene of interest imaged by an event-based camera. An event-based camera is operated, imaging the scene of interest, the imaging providing a plurality of events 2 as output. The event-based camera comprises a plurality of pixels whose imaging behaviour is influenced by a set of pixel parameters. The event-based camera is operated with a first value assignment to the set of pixels. Based on at least the plurality of events 2, an image is reconstructed 3, and in the reconstructed image, at least one region is determined 4 which corresponds to a spatial region in the scene of interest potentially comprising a flickering light source. Subsequently, a subset of pixels parameters of the set of pixel parameters is determined 5, wherein the subset of pixel parameters is associated to the pixels in the determined at least one region, and for the subset of pixel parameters, second values are determined 5 which are determined to mitigate flickering in the corresponding pixels of the determined at least one region. Before further operating 6 the event-based camera with updated pixel parameters, the first values of the subset of pixel parameters are updated/replaced 5 with the determined second values for the subset of pixel parameters. This way, in reconstructed image(s) based on the further operating 6, flickering in the determined at least one region is mitigated.

Figure 2:
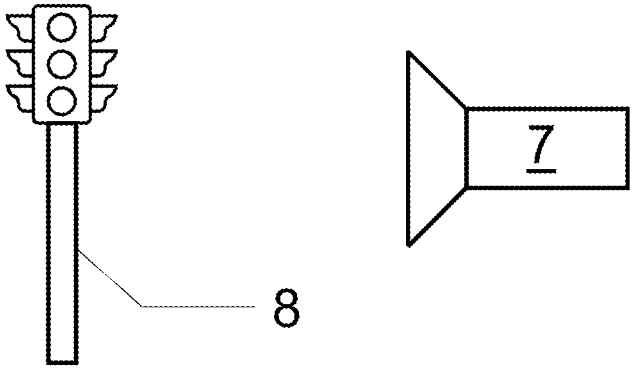
FIG. 2 illustrates schematically an event-based camera imaging a scene of interest comprising a traffic light source as flickering light source.

FIG. 2 illustrates schematically an event-based camera imaging a scene of interest comprising a traffic light source as flickering light source. The event-based camera 7 may be mounted/installed in a car, for example, which car is configured for autonomous driving; the event-based camera 7 may therefore, by imaging the scene of interest through which the car drives, provide information to a driving algorithm steering the car. A traffic light source 8, the traffic light source 8 comprising light emitting diodes, in the scene of interest may be controlled by a pulse-width modulation signal which in turn induces flickering. Using a method according to the invention, by a suitable combination of algorithmic processing and hardware settings of the event-based camera 7, such flickering is mitigated.

Figure 3:
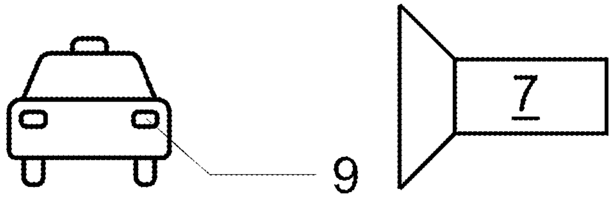
FIG. 3 illustrates schematically an event-based camera imaging a scene of interest comprising a car comprising at least one car light as flickering light source.

FIG. 3 illustrates schematically an event-based camera imaging a scene of interest comprising a car comprising at least one car light as flickering light source. FIG. 3 is structurally similar to FIG. 2: in FIG. 3, the flickering light source is embodied as a car light 9 of a further vehicle, while the event-based camera 7 may be mounted, as in FIG. 2, on a vehicle driving through the scene of interest in which the further vehicle, e.g., the car comprising the at least one car light, is also driving.

Figure 4:
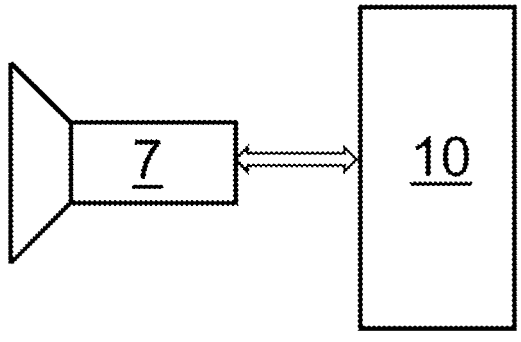
FIG. 4 illustrates schematically an embodiment of an assembly according to the invention.

FIG. 4 illustrates schematically an embodiment of an assembly according to the invention. The assembly comprises an event-based camera 7 and a computing device 10. The computing device 10 is configured to reconstruct an image from the plurality of events generated by the event-based camera 7 imaging a scene of interest and to determine at least one region in the reconstructed image. The computing device 10 receives the plurality of events from the event-based camera 7 as input and provides coordinates of pixels in that determined at least one region as output to the event-based camera 7, whereupon the event-based camera 7, specifically a readout processor of the event-based camera, determines second values for subsets of pixel parameters associated to the pixels in the determined at least one region; the event-based camera 7 subsequently updates its respective hardware parameters. In FIG. 4, the computing device is physically separate from the event-based camera, e.g., being located in a trunk of a car in which the assembly is installed. Alternatively, the computing device 10, typically embodied as microprocessor, may be part of the event-based camera 7, implying that all processing may be done in the event-based camera 7.

The invention claimed is:

1. A method for mitigating flickering lights in a scene of interest imaged by an event-based camera, wherein the event-based camera comprises a plurality of pixels, wherein an imaging behaviour of the plurality of pixels is influenced by a set of pixel parameters comprising at least one exposure time parameter and/or at least one digital accumulation parameter, and wherein the method comprises the following steps:

1) operating the event-based camera having an assignment of first values to the set of pixel parameters, said operating providing a plurality of events generated by the event-based camera;
2) reconstructing an image based on at least the generated plurality of events,
3) determining at least one region in the reconstructed image, said determined at least one region corresponding to at least one spatial region in the scene of interest comprising at least one flickering light source active during the operating of the event-based camera,
4) determining a subset of pixel parameters of the set of pixel parameters, which subset of pixel parameters influences the imaging behaviour of pixels in the determined at least one region, assigning second values for the determined subset of pixel parameters, which second values are determined to mitigate flicker in the pixels of the determined at least one region, and updating the first values assigned to the subset of pixel parameters with the second values, and
5) further operating the event-based camera with the updated set of pixel parameters.

2. The method according to claim 1, wherein an event condition involved in the generation of the plurality of events is embodied as a temporal contrast condition and/or as a temporal difference condition and/or as a spatial contrast condition and/or as a spatial difference condition.

3. The method according to claim 1, wherein analogue-domain detection signal accumulation of each pixel, the detection signal being provided by a photodetector comprised by the respective pixel, is influenced by the at least one exposure time parameter, wherein each pixel of the plurality of pixels is associated to an exposure time parameter of the at least one exposure time parameter.

4. The method according to claim 1, wherein the plurality of pixels is arranged as a pixel array with a plurality of rows and a plurality of columns, wherein the event-based camera comprises a readout processor, and wherein the readout processor is configured to, during the operating of the event-based camera, consecutively read out one row from the plurality of rows after another and to generate the plurality of events.

5. The method according to claim 2, wherein the image is reconstructed based on i) the plurality of events and ii) at least one previously generated image in case the generated plurality of events is generated based on the temporal contrast condition and/or based on the temporal difference condition.

6. The method according to claim 1, wherein the determining of the at least one region in the reconstructed image comprises the following steps: a) determining at least one histogram of the reconstructed image, b) thresholding the reconstructed image based on the determined at least one histogram, the thresholding providing two thresholded reconstructed images, c) filtering out noisy bright pixels in the two thresholded reconstructed images using at least one morphology function, and d) using a blob detection technique, determining bright spots in the two thresholded reconstructed images and selecting those bright spots from the determined bright spots whose shape is substantially similar in the two thresholded reconstructed images, with the selected bright spots being the determined at least one region.

7. The method according to claim 1, wherein the determining of the at least one region in the reconstructed image comprises applying a trained neural network to the reconstructed image, wherein the trained neural network provides the at least one region as output in the form of at least one bounding box and/or in the form of at least one anchor box and/or in the form of segmentation mask and/or in the form of a probability heatmap.

8. The method according to claim 3, wherein the determined subset of pixel parameters comprises at least one exposure time parameter and at least one digital accumulation parameter, and wherein the assigning of the second values for the at least one exposure time parameter and the at least one digital accumulation parameter comprises as steps: a) determining a required total accumulation duration, which required total accumulation duration is based on flickering frequencies of the at least one flickering light source active during the operating of the event-based camera, or receiving a desired total accumulation duration, b) based on the determined required total accumulation duration or the desired total accumulation duration and sampled detection signals of the pixels in the at least one determined region obtained during the operating of the event-based camera, assigning the second values for the at least one exposure time parameter in such a way that the pixels in the determined at least one region are not oversaturated during the further operating, and c) assigning the second values for the at least one digital accumulation parameter based on the determined second values for the at least one exposure time parameter and the determined required total accumulation duration or the desired total accumulation duration.

9. The method according to claim 8, wherein the flickering frequencies are assumed to be larger than 50 Hertz, in particular larger than 80 Hertz, and wherein the required total accumulation duration is chosen to be larger than the reciprocal of the assumed flicker frequency, so that in a reconstructed image based on a plurality of events generated during the further operating of the event-based camera, the flicker is mitigated.

10. The method according to claim 8, wherein each pixel in the plurality of pixels comprises its own exposure time parameter, or wherein groups of pixels in the plurality of pixels share an exposure time parameter.

11. The method according to claim 1, wherein the at least one flickering light source is embodied as a traffic light source and/or as a car light source.

12. The method according to claim 1, wherein the plurality of events is generated at multiples of a period of a global clock of the event-based camera.

13. An assembly comprising a) an event-based camera comprising at least i) a plurality of pixels arranged as a pixel array, ii) a readout processor, and iii) parameter memory for storing a set of pixel parameters, and b) a computing device, in particular embodied as a microprocessor, wherein the event-based camera is configured to transmit generated events to the computing device, wherein the assembly is configured to carry out a method according to claim 1, wherein the event-based camera is configured to carry out method steps 1), 4) and, 5) and wherein the computing device is configured to carry out method steps 2) and 3).

14. The assembly according to claim 13, wherein the computing device is part of the event-based camera, or wherein the computing device is an external computing device separate from the event-based camera.

15. A vehicle comprising an assembly according to claim 13, wherein the vehicle is configured to drive in a scene of interest comprising traffic lights and car lights of other vehicles.

* * * * *